United States Patent [19]

Rumpf et al.

[11] Patent Number: 5,014,926
[45] Date of Patent: May 14, 1991

[54] WEB SENSITIVE AND VEHICLE SENSITIVE RETRACTOR

[75] Inventors: Robert J. Rumpf, Grosse Pointe; Ronald A. Willey, Port Huron; Kevin Storck, Mt. Clemens, all of Mich.

[73] Assignee: TRW Vehicle Safety Systems Inc., Lyndhurst, Ohio

[21] Appl. No.: 434,024

[22] Filed: Nov. 9, 1989

[51] Int. Cl.$^5$ .................... B60R 22/38; B60R 22/40
[52] U.S. Cl. ..................... 242/107.4 A; 242/107.4 B
[58] Field of Search ............... 242/107.4 A, 107.4 B; 280/806; 297/478, 480

[56] References Cited

U.S. PATENT DOCUMENTS

| | | | |
|---|---|---|---|
| 4,293,106 | 10/1981 | Standing | 242/107.4 B X |
| 4,422,594 | 12/1983 | Hönl | 242/107.4 A |
| 4,452,405 | 6/1984 | Adomeit | 242/107.4 A |
| 4,455,000 | 6/1984 | Nilsson | 242/107.4 A |
| 4,467,980 | 8/1984 | Fohl | 242/107.4 B |
| 4,667,893 | 5/1987 | Fohl | 242/107.4 A X |
| 4,726,541 | 2/1988 | Tsukamoto et al. | 242/107.4 B |
| 4,729,525 | 3/1988 | Rumpf | 242/107.4 A X |

Primary Examiner—John M. Jillions
Attorney, Agent, or Firm—Tarolli, Sundheim & Covell

[57] ABSTRACT

A vehicle seat belt retractor includes a spool on which seat belt webbing is wound. The spool is rotatable in belt withdrawal and belt retraction directions. A lock bar is movable into engagement with a spool locking ratchet to lock the spool against rotation in the belt withdrawal direction. A first member is rotatable with the spool. A lock bar actuator is supported for rotation on the first member. Rotation of the lock bar actuator moves the lock bar into engagement with the spool locking ratchet. A flywheel is rotatable relative to the spool. The flywheel lags rotation of the spool upon acceleration of the spool in the belt withdrawal direction at a rate above a predetermined rate. In response to lagging rotation of the flywheel relative to the spool, the control pawl moves in an opening in the first member. The pawl engages the lock bar actuator and transmits rotational force from the first member to the lock bar actuator to move the lock bar actuator. A vehicle deceleration sensitive member carried by the lock bar actuator is movable in response to deceleration of the vehicle at a rate above a predetermined rate into engagement with the first member. The lock bar actuator is then rotated due to the vehicle deceleration sensitive member transmitting rotational force to the actuator from the first member.

10 Claims, 5 Drawing Sheets

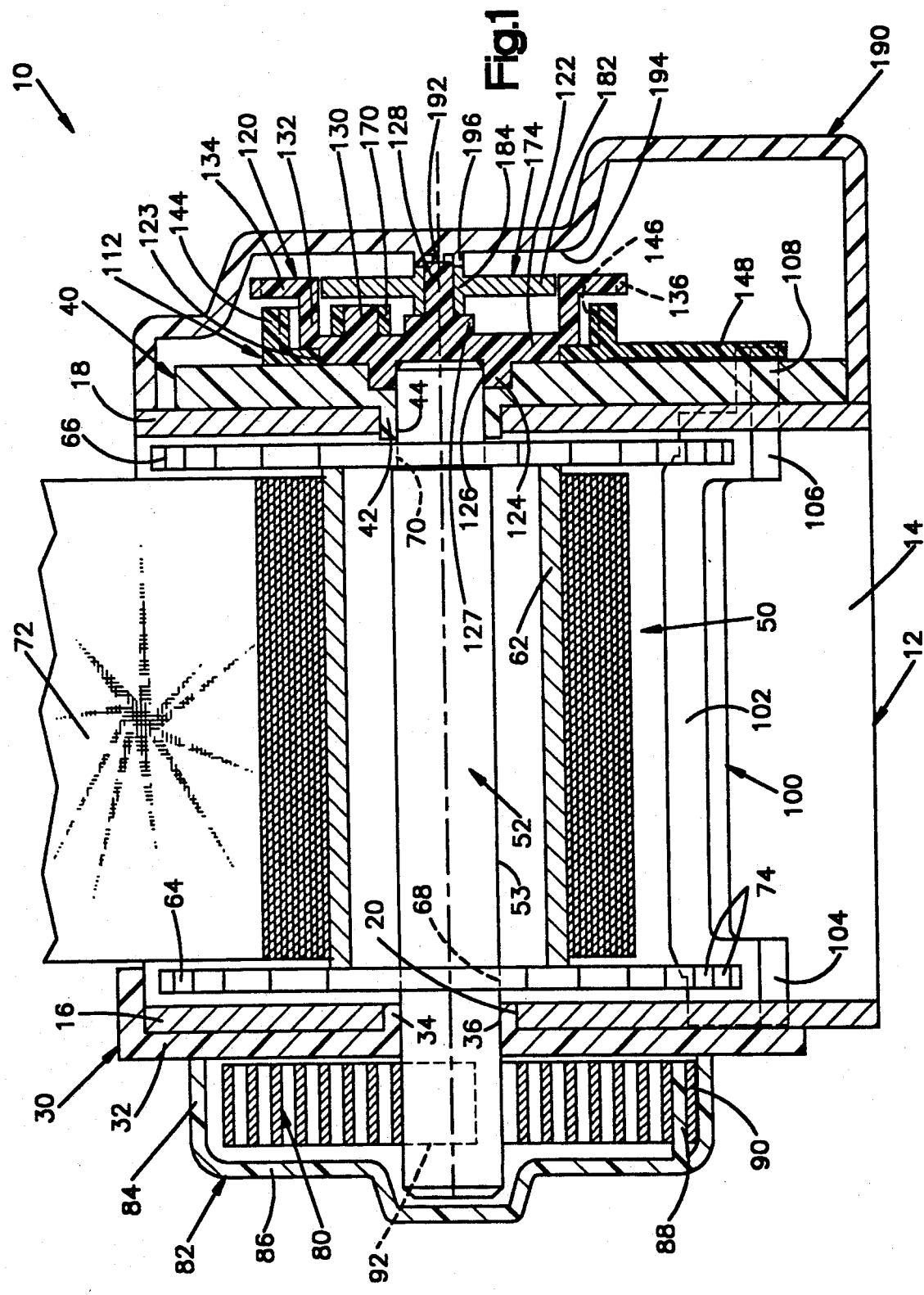

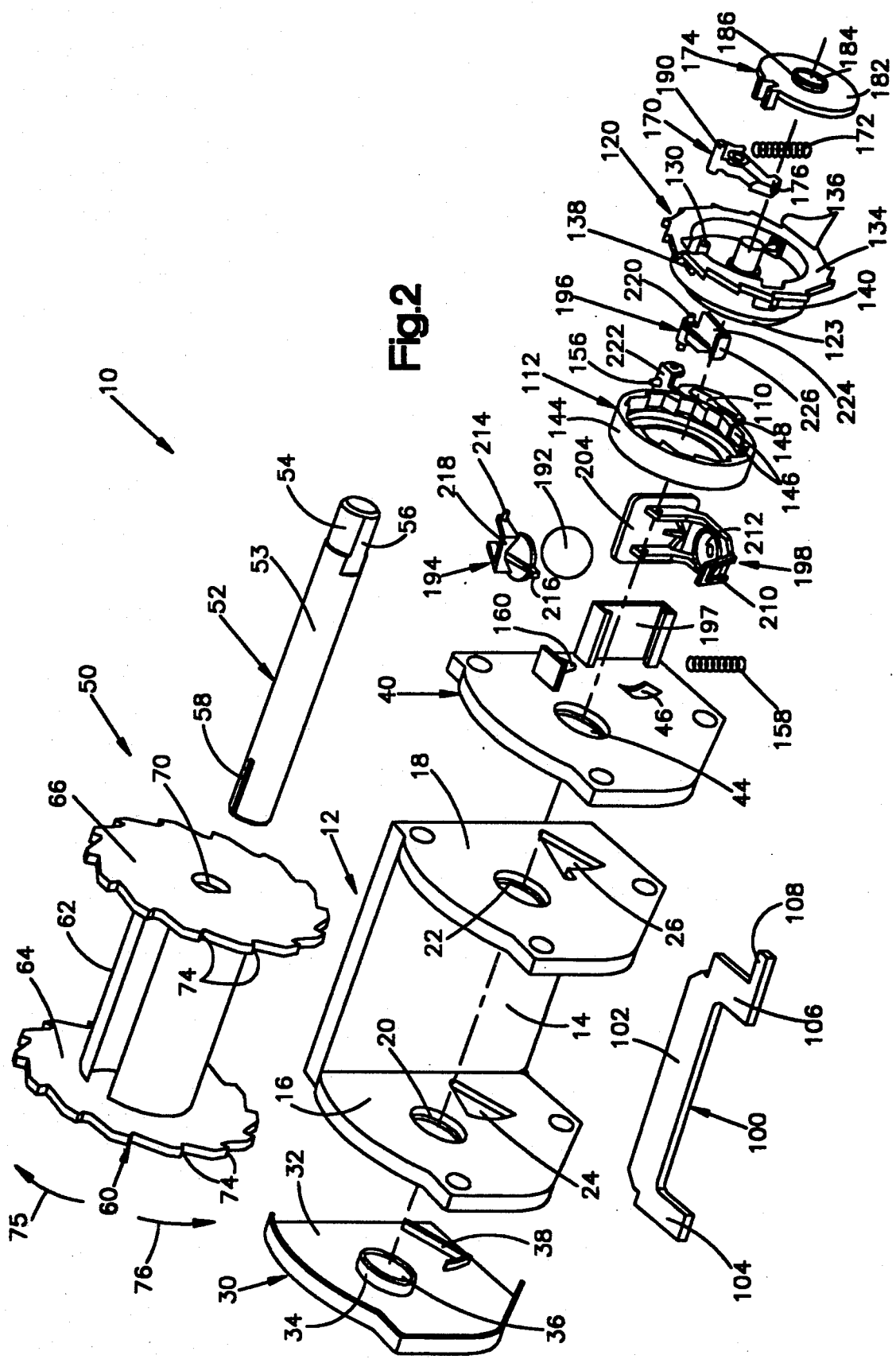

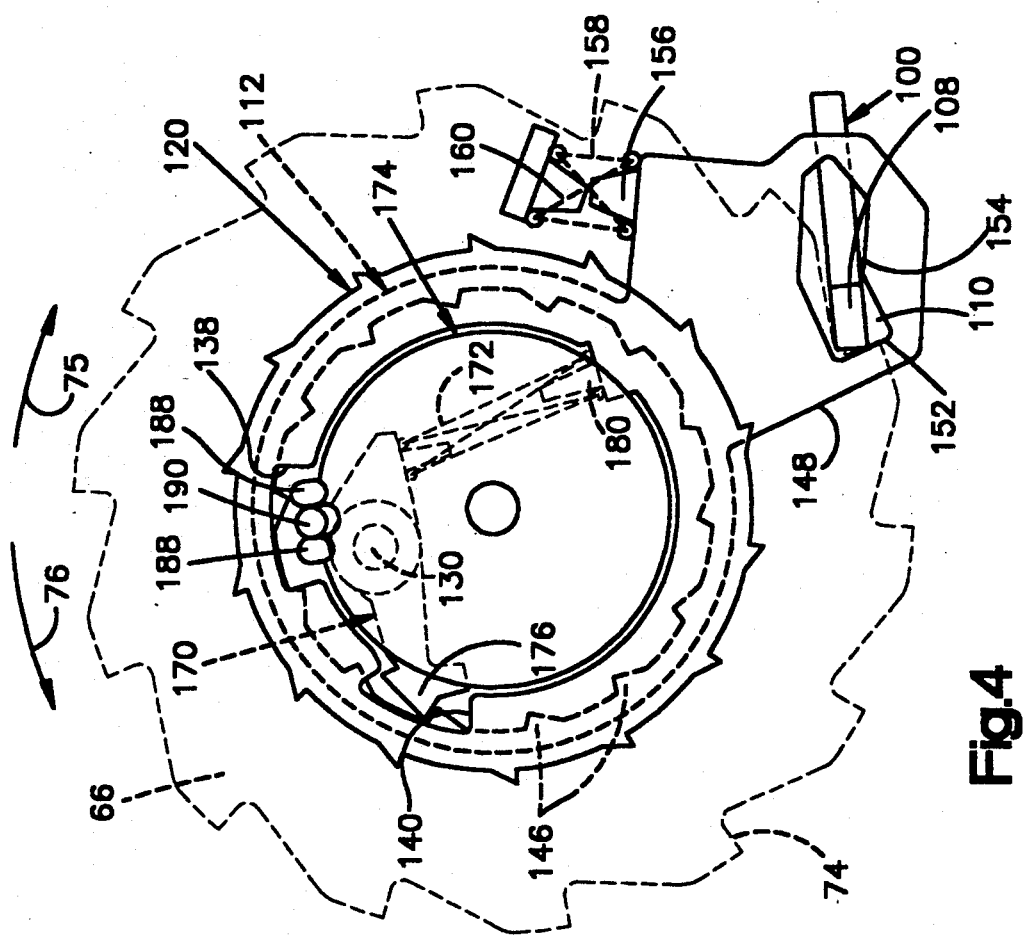
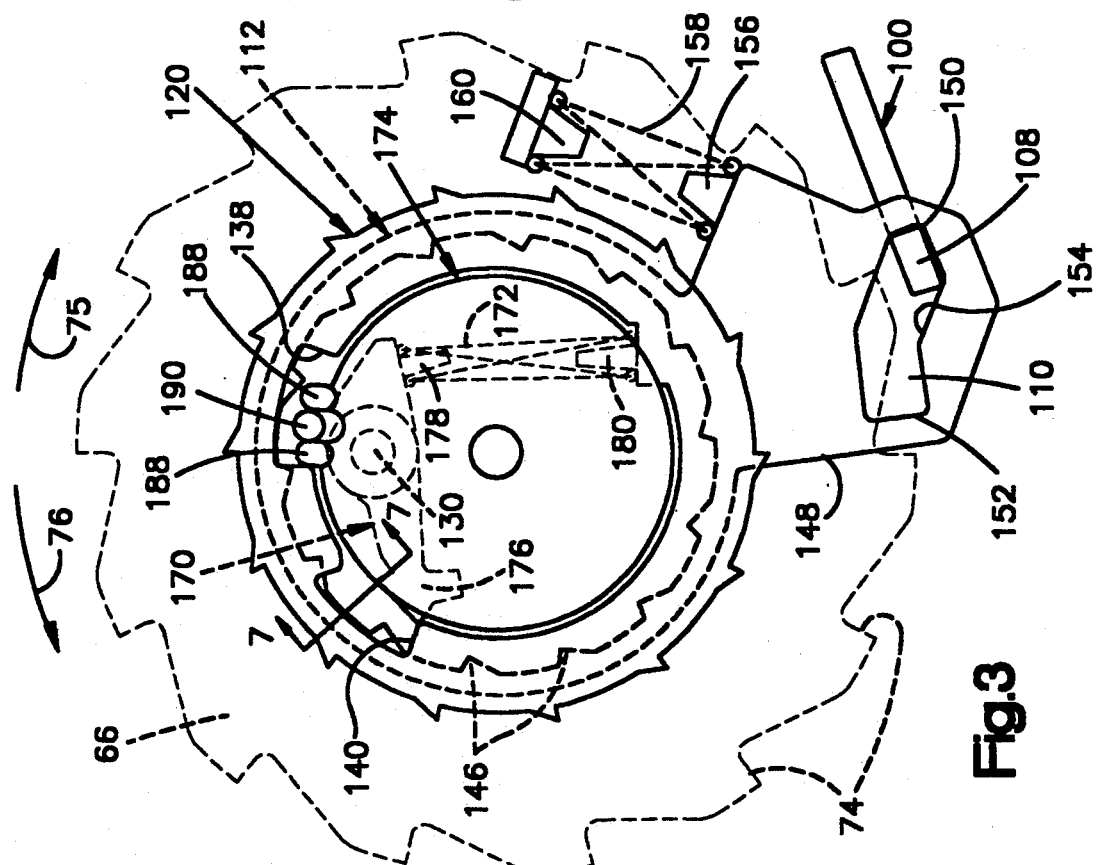
Fig.4
Fig.3

WEB SENSITIVE AND VEHICLE SENSITIVE RETRACTOR

BACKGROUND OF THE INVENTION

1. Technical Field

The present invention relates to a vehicle seat belt retractor having a spool on which seat belt webbing is wound. The spool can be blocked from rotation in the belt withdrawal direction either (i) in response to acceleration of the spool in the belt withdrawal direction at a rate above a predetermined rate or (ii) in response to deceleration of the vehicle at a rate above a predetermined rate. The retractor is thus both web sensitive and vehicle sensitive.

2. Description of the Prior Art

U.S. Pat. No. 4,422,594 discloses a retractor which is both web sensitive and vehicle sensitive. Upon sudden vehicle deceleration, a vehicle sensitive inertia member pivots a sensor lever. The sensor lever moves an operating lever into engagement with an external tooth on a support member which rotates with the spool. The operating lever is carried by a locking pawl actuator. Rotation of the support member then results in the locking pawl actuator being rotated. When the locking pawl actuator rotates, it moves a locking pawl into engagement with ratchets fixed to the spool, thus blocking rotation of the spool in the belt withdrawal direction. Upon rapid belt withdrawal from the spool, a web sensitive inertia sensor pivots into engagement with an internal tooth on the locking pawl actuator. The web sensitive inertia sensor is pivotally mounted on the rotating support member. Rotation of the support member when the web sensitive inertia sensor is in engagement with an internal tooth on the locking pawl actuator results in the locking pawl actuator rotating. When the locking pawl actuator rotates, the locking pawl is moved into engagement with the ratchets to block rotation of the spool in the belt withdrawal direction.

U.S. Pat. No. 4,452,405 also discloses a retractor which is both web sensitive and vehicle sensitive. Upon sudden vehicle deceleration, a vehicle sensitive inertia member pivots a sensor lever carried by a locking pawl actuator into engagement with an external tooth on a control gear which rotates with the spool. Rotation of the control gear then causes rotation of the locking pawl actuator which moves a locking pawl into engagement with a ratchet fixed to the spool, thereby blocking rotation of the spool in the belt withdrawal direction. Upon rapid belt withdrawal from the spool, a flywheel rotates relative to the control gear. Relative rotation of the control gear and flywheel pivots a control pawl carried by the control gear into engagement with an internal tooth on the locking pawl actuator. Thereafter, rotation of the spool causes the control gear and locking pawl actuator to rotate to move the locking pawl into engagement with the ratchet, thereby blocking rotation of the spool in the belt withdrawal direction.

SUMMARY OF THE INVENTION

The present invention is directed to a vehicle seat belt retractor which is both web sensitive and vehicle sensitive. The retractor includes a spool on which seat belt webbing is wound and which is rotatable in belt withdrawal and belt retraction directions. At least one spool locking ratchet is fixed to the spool for rotation with the spool. A lock bar is movable into engagement with the spool locking ratchet to lock the spool locking ratchet and the spool against rotation in the belt withdrawal direction. A first member is rotatable with the spool and has a hub portion. A lock bar actuator is supported for rotation on the hub portion of the first member. Rotation of the lock bar actuator effects movement of the lock bar into engagement with the spool locking ratchet.

The lock bar actuator is rotated in response to either vehicle deceleration at a rate above a predetermined rate or acceleration of the spool in the belt withdrawal direction at a rate above a predetermined rate. A flywheel is rotatable relative to the spool. The flywheel lags rotation of the spool upon acceleration of the spool in the belt withdrawal direction at a rate above a predetermined rate caused by rapid belt withdrawal from the spool. A control pawl is supported on a first member for movement relative to the first member in response to lagging rotation of the flywheel relative to the spool. A portion of the control pawl moves through an opening in the hub portion of the first member due to relative rotation of the spool and flywheel. The control pawl then engages the lock bar actuator and transmits force from the first member to the lock bar actuator to rotate the lock bar actuator. A vehicle deceleration sensitive member carried by the lock bar actuator is movable in response to deceleration of the vehicle at a rate above a predetermined rate into engagement with the first member to be moved thereby. The lock bar actuator is then rotated due to the vehicle deceleration sensitive member transmitting force to the actuator from the first member.

BRIEF DESCRIPTION OF THE DRAWINGS

Further features of the present invention will become apparent to those skilled in the art to which the present invention relates from reading the following specification with reference to the accompanying drawings, in which:

FIG. 1 is a longitudinal sectional view of a seat belt retractor embodying the present invention and with parts removed;

FIG. 2 is an exploded perspective view of certain parts of the retractor of FIG. 1;

FIG. 3 is a schematic view of the retractor of FIG. 1 showing certain parts of the retractor;

FIGS. 4 through 6 are views similar to FIG. 3 with parts shown in different positions.

DESCRIPTION OF A PREFERRED EMBODIMENT

Figure 6:
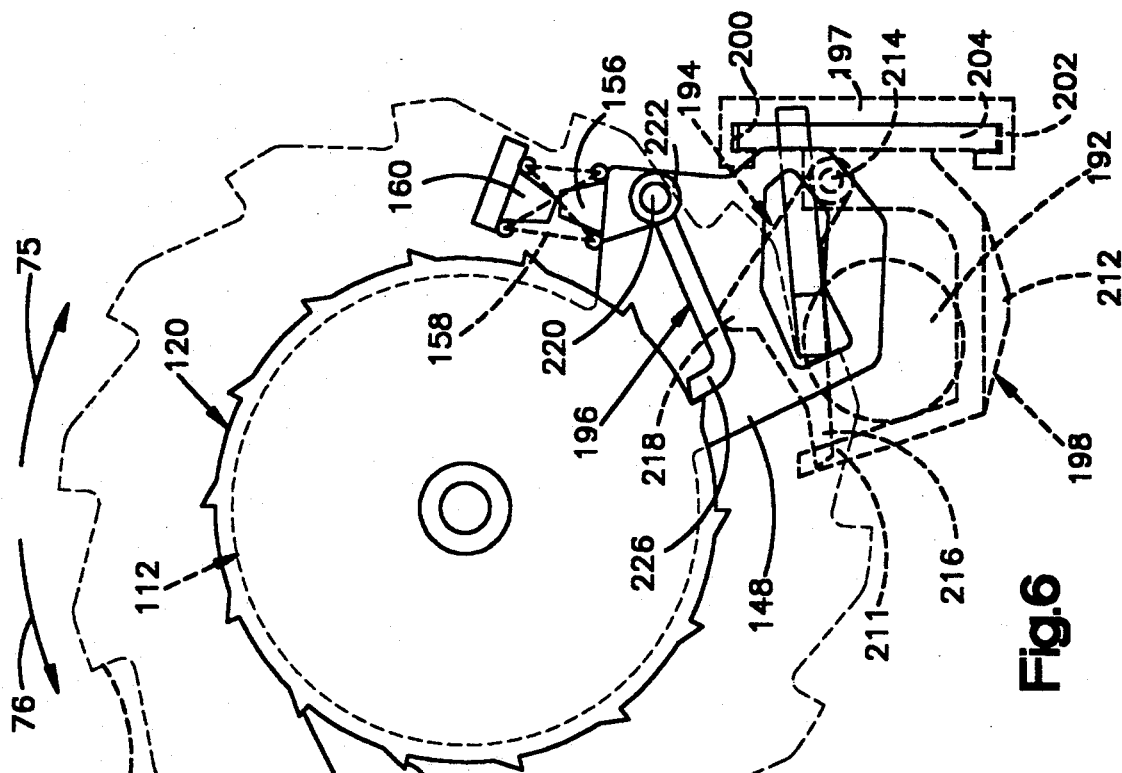

A vehicle seat belt retractor 10 (FIGS. 1 and 2) includes a frame 12 fixedly connected to the vehicle. The frame 12 includes a base 14 and sides 16 and 18 extending perpendicular to the base 14. A circular opening 20 and a lock bar opening 24 extend through the frame side 16. A circular opening 22, coaxial with opening 20, and a lock bar opening 26, aligned with opening 24, extend through the frame side 18. The frame 12 is preferably made of metal.

A plastic plate 30 is fixed to the frame side 16. The plate 30 includes a wall portion 32 with a projecting boss 34. An opening 36 extends through the wall portion 32 and boss 34. The wall portion 32 of the plate 30 abuts the frame side 16. The boss 34 fits within the opening 20 in the frame side 16. A projection 38 is attached to the wall portion 32 of the plate 30, and fits within the lock bar opening 24 in the frame side 16.

A plastic attachment plate 40 is fixed to the frame side 18. A circular boss 42 projects from the attachment plate 40. A circular opening 44 extends through the attachment plate 40 and the boss 42. The boss 42 fits within the opening 22 in the frame side 18. A lock bar opening 46 in the attachment plate 40 is aligned with a portion of the lock bar opening 26 in the frame side 18.

A spool 50 includes a shaft 52 having a full diameter portion 53 and a reduced diameter portion 54 at one end. A flat 56 on the shaft 52 extends axially for the length of the reduced diameter shaft portion 54 and for a small portion of the length of the full diameter portion 53. The flat 56 gives the shaft 52 a D-shaped cross-sectional configuration at its right end as viewed in FIG. 2. An axially extending slot 58 extends diametrically through the opposite end of the shaft 52.

The spool 50 also includes a reel 60 comprising a sleeve 62 and a pair of spool locking ratchet wheels 64 and 66 fixed to opposite axial ends of the sleeve 62. Each spool locking ratchet wheel 64 and 66 has on its perimeter a plurality of circumferentially spaced ratchet teeth 74. The shaft 52 extends axially through the reel 60. The full diameter portion 53 of the shaft 52 extends through a circular opening 68 (FIG. 1) in the spool locking ratchet wheel 64. The reduced diameter D-shaped portion of the shaft 52 extends through a D-shaped opening 70 in the ratchet wheel 66. Thus, the reel 60 rotates with the shaft 52. Seat belt webbing 72 is wound about the sleeve 62.

The shaft 52 extends through the opening 20 in the frame side 16 and the opening 36 in the plate 30 and is supported for rotation by the boss 34 on the plate 30. The shaft 52 also extends through the opening 22 in the frame side 18 and the opening 44 in the attachment plate 40 and is supported for rotation by the boss 42 projecting from the attachment plate 40. Thus, the spool 50 is rotatable in a belt retraction direction 75 (FIG. 2) and a belt withdrawal direction 76 relative to the retractor frame.

A rewind coil spring 80 (FIG. 1) is located within a spring cover 82 fixed to the plate 30. The spring cover 82 has an axially extending wall portion 84 and a radially extending wall portion 86. A spring catch member 88 is fixed to the inside of the spring cover 82. A radially outer end portion 90 of the rewind spring 80 is attached to the catch member 88. A radially inner end portion 92 of the rewind spring catch 80 is received in the slot 58 in the shaft 52. The rewind spring 80 acts between the spring cover 82 and the shaft 52 and biases the spool 50 to rotate in the belt retraction direction 75.

A lock bar 100 includes a central portion 102 (best shown in FIG. 2) which extends between a pair of locking portions 104 and 106. A lock bar finger 108 extends axially from the locking portion 106. One end of the lock bar 100 is supported on the plastic projection 38 in the opening 24 in the frame side 16. The plastic projection 38 minimizes rattling noises caused by metal-to-metal contact between the lock bar 100 and the frame side 16. The other end of the lock bar 100 extends through the opening 26 in the frame side 18. The lock bar finger 108 extends through the opening 46 in the attachment plate 40 and is received in a cam slot 110 in a lock bar actuator 112.

Figure 5:
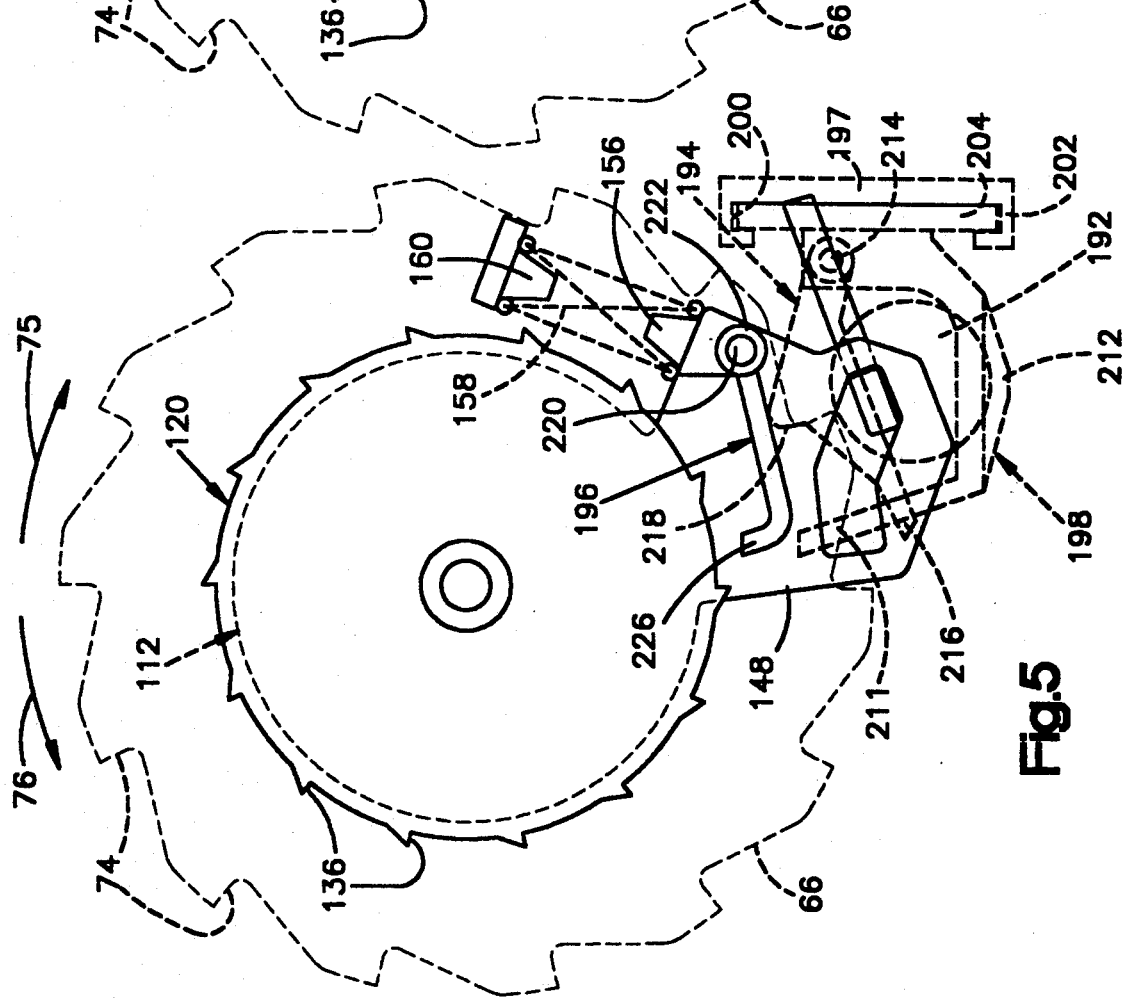

The actuator 112 has a plurality of internal teeth 146 on the interior of an outer wall 144. The lock bar actuator 112 is rotatable between a first position (as viewed in FIGS. 3 and 5) and a second position (as viewed in FIGS. 4 and 6). A spring 158 biases the actuator 112 into the first position as viewed in FIGS. 3 and 5. The spring 158 acts between a spring support 156 on the lock bar actuator 112 and a spring support 160 fixed to the attachment plate 40. The lock bar actuator 112 includes a radially extending cam portion 148. The cam slot 110 extends through the cam portion 148 of the actuator 112. The cam slot 110 (FIG. 3) has a first end 150, a second end 152, and a camming surface 154 between the ends 150 and 152. As previously noted, the cam slot 110 receives the extending finger 108 of the lock bar 100. When the actuator 112 is rotated from the position shown in FIG. 3 to the position shown in FIG. 4, the camming surface 154 moves relative to the lock bar 100. The lock bar 100 is cammed into a position where the locking portions 104 and 106 on the lock bar 100 engage ratchet teeth 74 on the spool locking ratchet wheels 64 and 66, respectively. Further rotation of the spool 50 in the belt withdrawal direction 76 is thereby blocked.

A ratchet 120 is disposed adjacent the actuator 112 and the attachment plate 40. The ratchet 120 has a radially extending disk portion 122 (see FIG. 1). A boss 124 projects axially from the disk portion 122 of the ratchet 120 in a direction toward the reel 60. A D-shaped opening 126 is formed in the boss 124 and receives the D-shaped end portion 54 of the shaft 52. Thus, the ratchet 120 rotates with the spool 50. The disk portion 122 also has a central projection 127 and a reduced diameter projection 128 which extend axially from the disk portion 122 in a direction away from the reel 60.

The ratchet disk portion 122 has a radially outer circular surface 123 which rotatably supports the lock bar actuator 112. The ratchet 120 also has a cylindrical wall 132 which extends axially from the disk portion 122 in a direction away from the reel 60. A circular wall 134 extends radially outwardly from the end of the wall 132. A plurality of ratchet teeth 136 are formed on the perimeter of the circular wall 134. The wall 132 and the wall 134 are partially cut away at two circumferentially spaced locations to form first and second openings 138 and 140 (FIGS. 2-4) extending radially through the ratchet 120 from the interior to the exterior of the ratchet.

Figure 7:
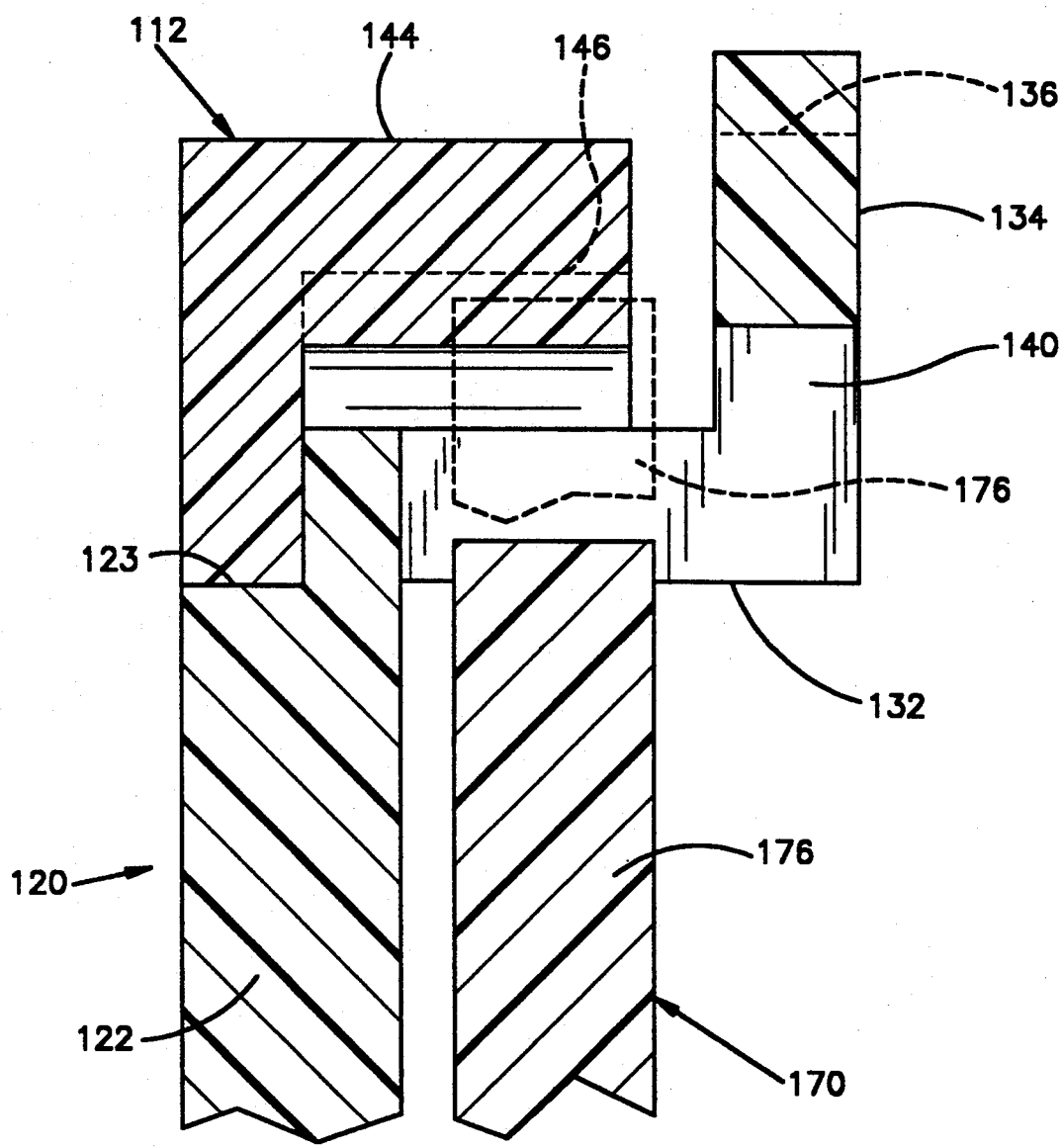
FIG. 7 is a fragmentary sectional view taken approximately along line 7—7 of FIG. 3.

A control pawl 170 (FIG. 3) is supported for pivotal movement on a pawl mounting hub 130 of the ratchet 120. The control pawl 170 has at one end a pawl tooth 176 and at its opposite end a spring support 178. The pawl tooth 176 is located adjacent the opening 140 in the ratchet 120, as shown in full lines in FIG. 7. A pawl spring 172 extends between the spring support 178 and a spring support 180 on the interior of the all 132 of the ratchet 120. The pawl spring 172 biases the pawl 170 about the mounting hub 130 so that the pawl tooth 176 is normally positioned radially inwardly, that is, spaced from, the internal teeth 146 of the lock bar actuator 112, as shown in FIG. 3.

A flyweight 174 made of a relatively heavy material, such as zinc, is supported on the ratchet 120 for rotation relative to the ratchet 120. The flyweight 174 has a disk portion 182 and a hub 184 having a central opening 186 extending through the hub. The axial projection 128 of the ratchet 120 extends through the opening 186 in the flyweight 174. A pair of circumferentially spaced control pins 188 are positioned on the perimeter of the disk portion 182 of the flyweight 174 and project radially and axially into the opening 138 in the ratchet 120. The flyweight control pins 188 are spaced on either side of an axially extending pin 190 (FIGS. 2-4) on the control pawl 170. The flyweight 174 is thereby rotated by the pin 190 as the pawl 170 rotates with the ratchet 120.

The flyweight 174 is retained axially by a cover 190 (FIG. 1) fixed to the attachment plate 40 and the retractor frame 12. A central projection 192 on the inner surface 194 of the cover 190 engages the axial projection 128 of the ratchet 120. An annular projection 196 on the inner cover surface 194 of the cover 190 engages the flyweight hub 184 and holds the flyweight 174 axially against the projection 127 on the ratchet 120.

The lock bar actuator 112 is rotated to pivot the lock bar 100 into engagement with the spool locking ratchet wheels 64 and 66 in response to withdrawal of seat belt webbing 72 from the spool 50 at a rate of acceleration above a predetermined rate. Withdrawal of seat belt webbing 72 from the spool 50 at a rate above the predetermined rate causes rapid acceleration of the spool 50. The ratchet 120 and the pawl 170, which are rotationally fixed to the spool 50, also accelerate rapidly in the belt withdrawal direction 76. The flyweight 174 lags behind rotation of the spool 50, because it is relatively heavy, and rotates relative to the ratchet 120 and the pawl 170. The flyweight control pins 188 tend to retard rotation of the pin 190 on the control pawl 170. The control pawl 170 thus pivots on the mounting hub 130, against the biasing force of the spring 172. The pawl tooth 176 moves radially outwardly in the opening 140 in the ratchet 120 and engages one of the internal actuator teeth 146 (as shown in dotted lines in FIG. 7), thereby coupling the ratchet 120 and the actuator 112 for rotation. Thereafter, the pawl 170 transmits rotational force from the spool 50 to the actuator 112 to rotate the actuator 112 in the belt withdrawal direction 76, from the position shown in FIG. 3 to the position shown in FIG. 4. Thus, the lock bar 100 is cammed into engagement with the spool locking ratchet wheels 64 and 66, blocking rotation of the spool 50 in the belt withdrawal direction 76.

The retractor 10 also includes a vehicle deceleration sensing inertia weight 192, which may be, for example, a steel ball. The inertia weight 192 rests in a cavity 212 in a sensor housing 198. A sensor housing support plate 197 (FIG. 2) is fixed to the attachment plate 40. The support plate 197 has an upper channel 200 and a lower channel 202. A back plate 204 of the sensor housing 198 is received in the upper and lower channels 200 and 202 of the sensor housing support plate 197. The sensor housing 198 is thereby fixedly connected, through the attachment plate 40, to the retractor frame 12.

A sensor lever 194 is pivotally mounted on the sensor housing 198. Two pivot pins 214 on the sensor lever 194 are received in openings in the sensor housing 198. The sensor lever 194 rests upon the inertia weight 192. A projection 216 of the sensor lever 194 extends through an opening 210 in the sensor housing 198. The projection 216 can engage a portion 211 of the housing 198 to limit upward pivotal movement of the sensor lever 194. A portion 218 of the sensor lever 194 extends upwardly from the sensor lever 194 in a direction away from the inertia weight 192.

An L-shaped lock-up lever 196 rests on the projecting portion 218 of the sensor lever 194. The lock-up lever 196 is pivotally mounted on the cam portion 148 of the lock bar actuator 112. Two pivot pins 220 on the lock-up lever 196 are received in a lever mounting portion 222 of the actuator 112. A first leg 224 of the lock-up lever 196 extends from the pins 220 of the lock-up lever 196 and rests on the portion 218 of the sensor lever 194. A second leg 226 extends at an angle to and upwardly from the first leg 224 in a direction toward the ratchet 120.

When the vehicle in which the retractor 10 is mounted is not decelerating at a rate above a predetermined rate, the inertia weight 192 rests in the cavity 212 (FIG. 5) in the bottom of the sensor housing 198. When the inertia weight 192 is in this position, the second leg 226 of the lock-up lever 196 is spaced from the exterior teeth 136 on the ratchet 120. Upon deceleration of the vehicle at a rate above a predetermined rate, the inertia weight 192 moves relative to the sensor housing 198. Movement of the inertia weight 192 pivots the sensor lever 194 upwardly from the position shown in FIG. 5 to the position shown in FIG. 6. The portion 218 of the sensor lever 194 presses the lock-up lever 196 upwardly. The lock-up lever 196 pivots, and the second leg 226 of the lock-up lever 196 moves into engagement with the exterior of the ratchet 120. Rotation of the spool 50 and the ratchet 120 in the belt withdrawal direction 76 causes the next available ratchet tooth 136 to engage the second leg 226 of the lock-up lever 196. Thereafter, the lock-up lever 196 transmits rotational force from the ratchet 120 to the actuator 112 to rotate the actuator 112 from the position shown in FIG. 5 into the position shown in FIG. 6. Thus, the lock bar 100 is cammed into engagement with the spool locking ratchet wheels 64 and 66, blocking rotation of the spool 50 in the belt withdrawal direction 76.

From the above description of a preferred embodiment of the invention, those skilled in the art will perceive improvements, changes, and modifications in the invention. Such improvements, changes, and modifications within the skill of the art are intended to be covered by the appended claims.

We claim:

1. A vehicle seat belt retractor comprising:

a housing;

a spool on which seat belt webbing is wound and which is rotatable in belt withdrawal and belt retraction directions;

at least one spool locking ratchet wheel fixed to said spool for rotation therewith;

a first pawl supported on said housing and not rotatable with said spool and movable into a locking position in engagement with said spool locking ratchet wheel for transmitting spool locking force from said spool locking ratchet wheel to said housing to lock said spool locking ratchet wheel and said spool against rotation in the belt withdrawal direction, said first pawl having portions located in openings in said housing and which move in said openings when said first pawl moves;

a first member spaced from said spool locking ratchet wheel and having external ratchet teeth thereon and rotatable with said spool;

a second pawl carried by said first member and movable between first and second positions relative to said first member;

a flywheel rotatable relative to said spool and driven by said second pawl, said flywheel lagging rotation of said spool upon acceleration of said spool in the belt withdrawal direction at a rate above a predetermined rate;

means on said first member for supporting said second pawl for movement from its first position to its second position relative to said first member in response to lagging rotation of said flywheel relative to said spool;

a second member movable in response to vehicle deceleration at a rate above a predetermined rate into engagement with said external ratchet teeth on said first member to be moved thereby; and actuator means supported on said first member for rotation relative to said housing and movable to move said first pawl into its locking position, said actuator means being moved by said second pawl when said second pawl is in its second position and by said second member when said second member is in engagement with said first member, said first member having an opening in which said second pawl moves when said second pawl moves to its second position.

2. A seat belt retractor as defined in claim 1 wherein said first member comprises a ratchet having external teeth thereon, said actuator means comprises a third member having surfaces that define in said third member a cam groove in which said first pawl is received and that upon movement of said third member move said first pawl, and said second member comprises a first lever that is mounted on said third member and that moves into engagement with said external teeth of said ratchet which engagement moves said first lever and third member causing said first pawl to move to its locking position.

3. A seat belt retractor as defined in claim 1 wherein said actuator means comprises a third member having internal teeth encircling said first member, said opening in said first member being located radially inwardly of said internal teeth, said second pawl moving in said opening radially outwardly into engagement with one of said internal teeth when said second pawl moves to its second position.

4. A seat belt retractor as defined in claim 3 wherein said second pawl is pivotally mounted on said first member, and said retractor further includes a spring which acts between said first member and said second pawl and biases said second pawl to its first position and which is compressed by pivotal movement of said second pawl to its second position.

5. A seat belt retractor as defined in claim 2 further including a frame supporting said spool for rotation, an inertia member movable in response to vehicle deceleration at a rate above a predetermined rate, a support for said inertia member fixedly attached to said frame, and a second lever pivotal relative to said frame upon movement of said inertia member to effect pivotal movement of said first lever into engagement with said external teeth of said ratchet.

6. A seat belt retractor as defined in claim 1 wherein said actuator means comprises a third member having surfaces that define in said third member a cam groove in which said first pawl is received and that upon movement of said third member move said first pawl, and further including a frame supporting said spool for rotation, an inertia member movable in response to vehicle deceleration at a rate above a predetermined rate, a support for said inertia member fixedly attached to said frame, and a lever pivotal relative to said frame upon movement of said inertia member to effect movement of said second member into engagement with said first member.

7. A vehicle seat belt retractor comprising:
a housing;

a spool on which seat belt webbing is wound and which is rotatable in belt withdrawal and belt retraction directions;

at least one spool locking ratchet wheel fixed to said spool for rotation therewith;

a first pawl supported on said housing and not rotatable with said spool and movable into a locking position in engagement with said spool locking ratchet wheel for transmitting spool locking force from said spool locking ratchet wheel to said housing to lock said spool locking ratchet wheel and said spool against rotation in the belt withdrawal direction, said first pawl having portions located in openings in said housing and which move in said openings when said first pawl moves;

an actuator member supported on said first member for rotation relative to said housing and having internal teeth and rotatable to move said first pawl into its locking position;

a first member spaced from said spool locking ratchet wheel and having external ratchet teeth thereon and rotatable with said spool;

an inertia sensitive member carried by said actuator member and movable into engagement with said external ratchet teeth on said first member in response to vehicle deceleration at a rate above a predetermined rate and transmitting rotational force from said first member to said actuator member to rotate said actuator member to move said first pawl to its locking position; and a web sensitive member carried by said first member and movable in an opening in said first member into engagement with one of said internal teeth of said actuator member in response to withdrawal of seat belt webbing at a rate above a predetermined rate and transmitting rotational force from said first member to said actuator member to rotate said actuator member to move said first pawl to its locking position.

8. A seat belt retractor as defined in claim 7 wherein said opening in said first member is located radially inwardly of said internal teeth on said actuator member, said web sensitive member being pivotally mounted on said first member adjacent said opening and having a portion which is pivotable radially outwardly in said opening into engagement with one of said internal teeth on said actuator member.

9. A seat belt retractor as defined in claim 8 comprising a flywheel rotatable relative to said spool and driven for rotation by said web sensitive member, said flywheel lagging rotation of said spool upon acceleration of said spool in the belt withdrawal direction at a rate above a predetermined rate to effect pivotal movement of said portion of said web sensitive member into engagement with said internal teeth on said actuator.

10. A seat belt retractor as defined in claim 9 wherein said first member comprises a ratchet having external teeth thereon, said actuator member comprises a third member having surfaces that define in said third member a cam groove in which said first pawl is received and that upon movement of said third member move said first pawl, and said inertia sensitive member comprises a lever that is mounted on said third member and that moves into engagement with said external teeth of said ratchet which engagement moves said lever and third member causing said first pawl to move to its locking position.

* * * * *